United States Patent [19]

Schilling et al.

[11] 4,408,685
[45] Oct. 11, 1983

[54] FLUID SET AND SPRING RELEASED CLUTCH

[75] Inventors: Hugh K. Schilling, St. Paul; Charles D. Raines, Bethel, both of Minn.

[73] Assignee: Horton Industries, Inc., Minneapolis, Minn.

[21] Appl. No.: 206,362

[22] Filed: Nov. 13, 1980

[51] Int. Cl.³ ............................................. F16D 25/063
[52] U.S. Cl. ..................... 192/85 A; 192/66; 285/276; 285/281
[58] Field of Search ............. 192/85 A, 82 T, 85 AA, 192/85 AB, 85 AT, 66; 285/279, 281, 276, 375, 267; 474/171

[56] References Cited

U.S. PATENT DOCUMENTS

| | | | |
|---|---|---|---|
| 1,723,887 | 8/1929 | Pfaff | 192/66 |
| 1,783,513 | 12/1930 | Maurer | 192/85 AA X |
| 2,135,384 | 11/1938 | Brownlee | 192/66 X |
| 2,462,006 | 2/1949 | Schmitter et al. | 285/279 X |
| 2,684,742 | 7/1954 | Eason | 192/85 AA X |
| 2,723,136 | 11/1955 | Deubler | 285/276 X |
| 2,848,255 | 8/1958 | Klein et al. | 285/267 |
| 2,881,597 | 4/1959 | Jacobs | 192/84 C X |
| 3,055,475 | 9/1962 | Pitts | 192/84 C |
| 3,253,687 | 5/1966 | Young | 192/85 A |
| 3,409,305 | 11/1968 | Nieland | 277/40 |
| 3,539,046 | 11/1970 | Berg | 192/85 AT |
| 3,887,051 | 6/1975 | Bignell | 192/85 AA |
| 3,889,983 | 6/1975 | Freize | 285/276 X |
| 4,132,301 | 1/1979 | Zabonick | 192/85 AA |
| 4,226,095 | 10/1980 | Loken | 192/70.2 X |

FOREIGN PATENT DOCUMENTS

| | | |
|---|---|---|
| 1027905 | 4/1966 | United Kingdom . |
| 1030610 | 5/1966 | United Kingdom . |
| 1191235 | 5/1970 | United Kingdom . |
| 1285516 | 8/1972 | United Kingdom . |
| 1452981 | 10/1976 | United Kingdom . |

Primary Examiner—Rodney H. Bonck
Attorney, Agent, or Firm—Wicks & Nemer

[57] ABSTRACT

A fluid set and spring released clutch according to the teachings of the present invention is shown as including a one-piece hub including a cylindrical portion having a first tapered hole portion for securement to a shaft and a second cylindrical hole portion for receiving a rotary air union. A radially extending flange portion terminating in an annular lip is formed on the cylindrical portion of the hub and forms an annular cavity for the reciprocal receipt of a piston. The clutch further includes a pulley rotatably received on the hub having a recess formed therein. An extension integrally attached to the piston extends into the recess of the pulley for providing friction engagement therebetween. The piston is mounted by bolts threadably secured into the extension and reciprocally received in the annular lip of the hub. The piston is biased into the cavity by springs located between the piston and the hub. The rotary air union is in fluid communication with the cavity behind the piston and includes a base portion which is received in the cylindrical hole portion of the hub. A carbon face seal is received within the base portion and includes a radial flange which fits into a radial recess formed in the base portion to prohibit any rotation of the carbon face seal relative to the hub. A coil spring is positioned against the end of the base portion and biases an O-ring into the dome-shaped end of the carbon face seal for forcing contact of the O-ring against the dome-shaped end of the carbon face seal and for forcing contact of the carbon face seal with a cylindrical mount rotatably received within the base portion of the rotary union.

10 Claims, 4 Drawing Figures

FLUID SET AND SPRING RELEASED CLUTCH

SUMMARY

The invention relates broadly to clutches and more particular to clutches that are fluid set and spring released.

It is an object of the invention to provide a clutch having a construction which provides a compactness for use in crowded areas of diesel engine truck operation. It is a further object of the invention to provide a clutch that is mounted on a shaft to be rotated by the clutch. It is a still further object to provide a clutch having a one piece hub and piston, a portion of which is within a cavity formed in a driving pulley. Additionally, provided is a new and novel rotary air union whereby fluid pressure is delivered to the clutch for operation thereof.

The invention will appear more clearly from the following detailed description when taken in connection with the accompanying drawings, showing by way of example a preferred embodiment of the inventive idea wherein like numerals refer to like parts throughout.

In the drawings forming part of this application:

Figure 1:
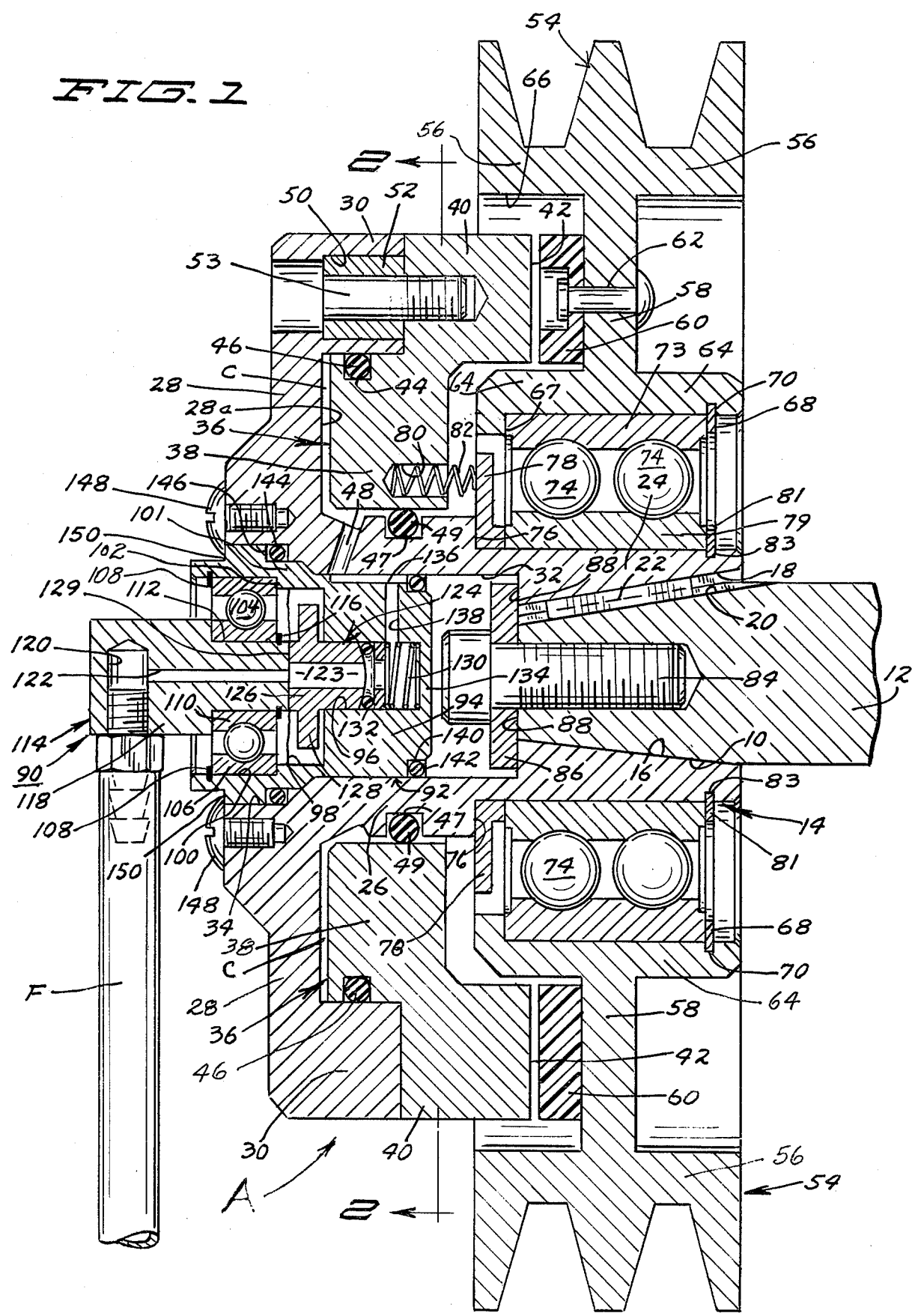
FIG. 1 is a sectional view through a fluid set and spring release clutch embodying the invention and on the line 1—1 of FIG. 3.
Figure 2:
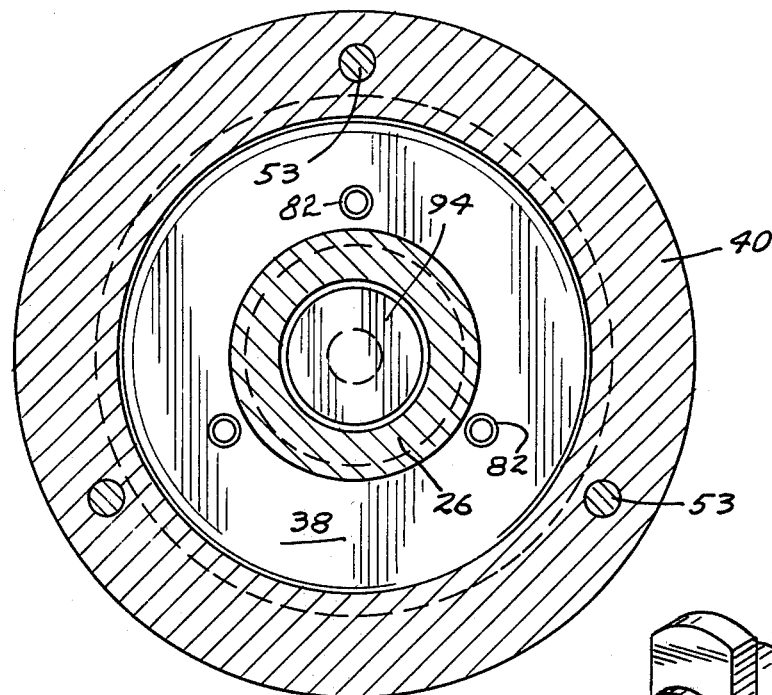
FIG. 2 is a sectional view on the line 2—2 of FIG. 1.

Referring to the drawings in detail, the clutch A is mounted on the tapered end 10 of the shaft 12 mounted on bearings in a compressor pump not shown. The clutch includes the driven hub 14 having the tapered hole 16 in which a keyway 18 is formed. The tapered end 10 of the shaft 12 is also formed with a keyway 20 and a key 22 is placed in the keyways 18 and 20 to thereby mount the hub 14 on the shaft 12.

The hub 14 includes the inner annular mounting flange portion 24 which terminates in an annular and axially extending cylinder forming portion 26 which in turn terminates in the integral and radially extending flange portion 28. The outer edge of the portion 28 terminates in the right angular cylinder-forming annular lip 30. The hub portions 24 and 26 together with the flange 28 are one integral piece. The cylinder-forming portion 26 of the hub is formed with the internal cylindrical and axial recess 32 terminating at the outer end in the enlarged cylindrical recess portion 34, the recesses 32 and 34 forming a cavity for the air union.

The numeral 36 designates a piston having the annular body portion 38 which fits within the inner surface of the annular lip 30 and the outer surface of the hub cylinder-forming portion 26. Extending radially outwardly and offset from and as part of the piston body portion 38 is the annular shoulder portion 40 having the annular and radially disposed friction facing surface 42. The outer cylindrical surface of the piston body portion 38 is formed with the annular recess 44 in which is positioned the O-ring 46 which makes sealing contact with the inner annular surface of the cylinder-forming annular lip 30. The outer surface of the hub portion 26 is formed with the annular groove 47 in which is positioned the O-ring 49 for sealing contact with piston body 38.

The cylinder cavity C is formed by the inner surface of the lip 30, the inner surface 28a of the flange 28 and the outer surface of the cylinder-forming portion 26 of the hub 14. The cylinder-forming hub portion 26 is formed with the fluid conduit 48. The lip portion 30 of the hub 14 is formed with a series of spaced holes 50 in each of which is press fit a bronze bushing 52. Mounted on the flange 28 are a series of torque bolts 53 each of which slideably extends through a bushing 52 with the inner end of the torque bolt threadedly engaged with the shoulder portion 40 of the piston 36.

The numeral 54 designates a V-belt pulley including the outer annular flange 56. Extending centrally and radially inwardly of the annular body portion 56 is the annular web 58 on which is mounted the friction facing ring 60 by means of spaced bolts 62. The annular web 58 terminates radially inwardly in the inner annular body portion substantially coextensive with the outer annular flange 56. It will be seen that a portion of the pulley flange 56 and a portion of the pulley body portion 64 form a cavity 66 in which the piston shoulder portion 40 extends and in which the friction facing 60 is mounted for contact with the friction facing surface 42 of the piston 36.

The inner pulley flange 64 is formed with the annular internal shoulder 67, and positioned between the shoulder 67 and the retaining ring 68 positioned in a groove 70 formed in the pulley flange 64 is the outer race 73 of the bearing 74. The hub 14 is formed with the recess shoulder 76 against which is positioned the ring 78 with the inner bearing race 79 positioned between the ring 78 and the retaining ring 81 in turn positioned in groove 83 formed in hub portion 24.

The piston body portion 38 has formed therein a series of spaced holes 80 in each of which is positioned a coil spring 82 in compression contact with the annular ring 78 and which urge the facing surface 42 of the piston shoulder from the friction facing 60.

The shaft 12 is secured to the hub 24 by means of the bolt 84 with the head thereof upon the washer 86 positioned against the annular shoulder 88 formed at the inner end of the tapered hole 16 with the bolt threadedly engaged in the end of the shaft.

Further provided is the rotary air union 90 which includes the easy removable mount 92 including the cylindrical base portion 94 in which is formed the axial cylindrical internal recess 96. The recess 96 terminates at the inner end in the radially larger and axially aligned central annular and internal elongated recess 98 which in turn terminates in the annular internal and outermost recess 100 formed in an enlargement 101 of base portion 94 and which is radially larger than the central recess thereby forming the annular shoulder 102. The numeral 104 designates a bearing which has the outer race 106 thereof press fit within the recess 100 and against the annular shoulder 102 with the retaining ring 108 holding the outer race in position. The inner race 110 of the bearing 104 is press fit upon the reduced diameter portion 112 of the air shaft 114 and retained thereon by the retaining ring 116. The reduced portion 112 terminates in the larger diameter portion 118 which has the fluid inlet hole 120 formed therein normal to the axial conduit 122 extending from the hole 120 throughout the portion 112. A fluid supply line F is attached to the inlet hole 120.

Figure 4:
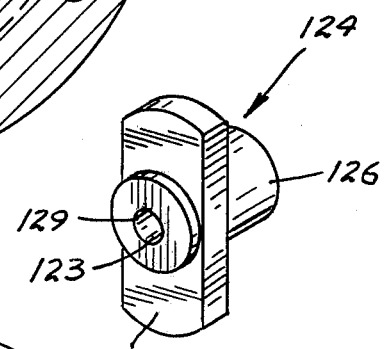
FIG. 4 is a perspective view of the carbon face seal removed from the clutch.
Figure 3:
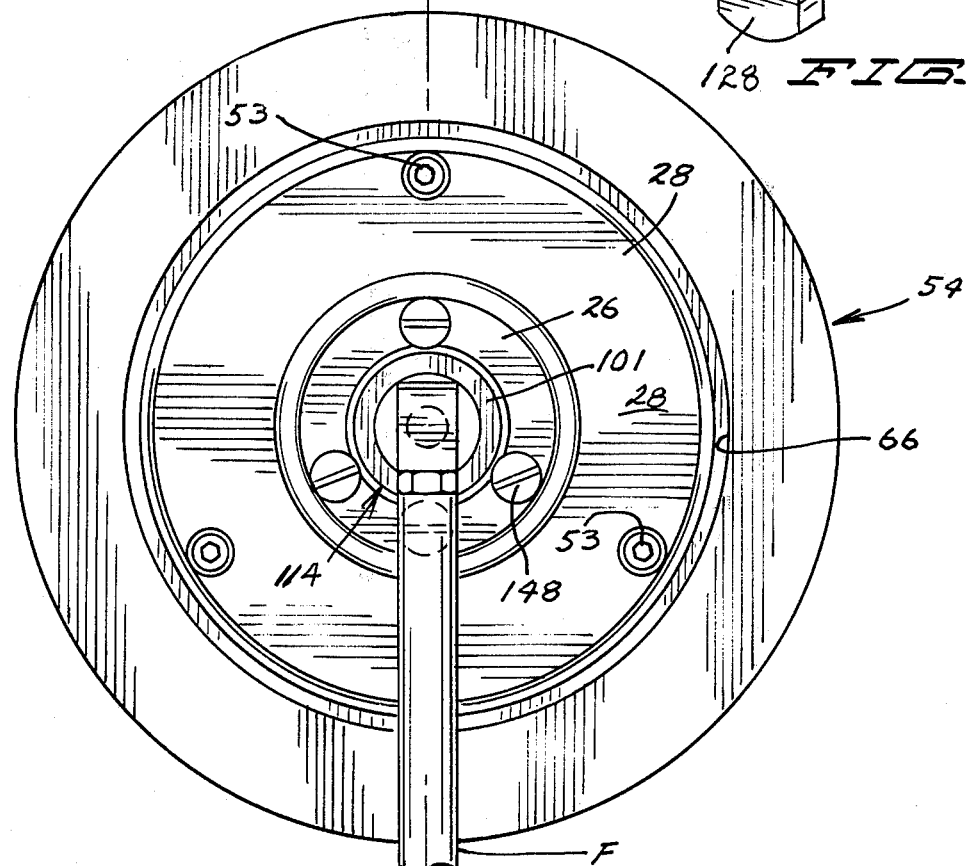
FIG. 3 is a front elevational view of the clutch.

Further provided is the carbon face seal 124, FIGS. 1 and 4, including the cylindrical base portion 126 with the radially extending elongated flange 128 which is positioned in the elongated recess 98 with the base portion 126 slideably mounted in the recess 96. The base portion 126 is formed with the axial hole 123 which aligns with conduit 122. The seal 124 is caused to rotate with the hub 14 because the flange 128 is positioned within the elongated recess 98. The end face 129 of the cylindrical base portion 126 is urged into intimate contact with the end of the reduced portion 112 of the air shaft 114 by means of the coil spring 130 within recess 96 and abutting the O-ring 132 and the end wall 134 of the base portion 94. The base portion 94 has formed on the outer surface thereof the conduit 136 which communicates with radially disposed conduit 138 which in turn communicates with the internal recess 96 and hole 123 of carbon face seal 124. Conduit 136 communicates with fluid conduit 48 of hub 14. Mounted on the recess 140 of the base portion 94 is the O-ring 142 for sealing contact with the recess 32 of the hub 14. A further O-ring 144 is provided which is positioned in the recess 146 formed in the enlargement 101 for sealing engagement with the recess portion 34 of hub 14.

The mount 92 of the air union is secured in the hub by means of a series of spaced bolts 148 threadedly engaged in the outer end of the hub 14 with the heads of the bolts in engagement with the annular shoulder 150 of the mount 92.

OPERATION

In the operation of the clutch let it be assumed that the pulley 54 is rotated by V-belts not shown from the crankshaft of an engine not shown. As a fluid is allowed to enter the line F it passes through axial conduit 122 of the rotary air union 90 and thence through the hole 123 of the carbon face seal 124 and from there to the internal recess 96 and from there to the conduits 138 and 136. From conduit 136 fluid pressure passes to the conduit 48 and thence to the cavity C whereby the the piston 38 is moved thereby causing the facing surface 42 of the piston annular shoulder portion 40 to engage the friction facing 60. As a result of the above, the hub 14 is rotated and the shaft 12 therewith, the shaft being mounted on bearings carried by an engine not shown. The shaft 12 is connected to a compression pump for an air conditioning unit not shown.

Having thus described the invention, what is claimed as new and desired to be secured by Letters Patent is:

1. A fluid engaged and spring disengaged clutch comprising:
   (a) a hub,
   (b) means for securing said hub to a shaft to be driven,
   (c) a pulley,
   (d) means rotatably mounting said pulley on said hub,
   (e) said hub having a radially extending integral flange portion,
   (f) means mounting an annular piston on said radially extending flange for slidable movement relative to said flange,
   (g) annular friction facing means,
   (h) means mounting said friction facing means in an annular recess formed in said pulley inwardly of the radially and outwardly extent of said pulley for engagement by
   (i) an integral annnular extension of said piston, with the annular piston mounting means including: an annular lip formed on said flange and having a series of spaced holes formed therethrough, with the annular lip, the radially extending flange, and the hub forming a piston cavity for the reciprocal receipt of the piston, and a series of spaced torque bolts mounted on one end on said flange and extending freely through the holes of said lip with the other ends of said bolts secured in said extension of said piston,
   (j) a rotary air union,
   (k) means rotatably mounting said hub on said rotary air union,
   (l) spring means located between said piston and said hub for urging said piston and extension thereon from contact with said friction facing means, and
   (m) means for introducing fluid pressure from the rotary air union between said piston and said radially extending flange to cause said piston extension to contact said friction facing means for driving said shaft.

2. The device of claim 1 in which said means mounting said friction facing means on said pulley includes
   (a) said pulley having an outer annular flange, and
   (b) an inner annular body portion connected in spaced relation by
   (c) a radially extending annular web spaced from one edge of said outer annular flange and one edge of said inner annular body portion thereby forming the annular recess of said pulley between said outer annular flange and said inner annular body portion and into which said extension of said piston is extended,
   (d) said friction facing secured to said annular web.

3. The device of claim 2 in which said means rotatably mounting said pulley on said hub includes a bearing carried by and between said inner annular body portion and said hub and in radial alignment with said annular web.

4. Apparatus for controlling relative rotation comprising, in combination: a one piece hub including an annular and axially extending cylindrical portion, an integral and radially extending flange portion, and an annular and axially extending lip integrally attached to the radially extending flange portion, with a cavity formed and defined by the cylindrical portion, the flange portion, and the lip; an annular piston having a size and shape for the reciprocal receipt within the cavity of the one piece hub; an extension extending radially outwardly, offset from, and integrally with the piston; means attached to the extension for mounting the extension and the piston to the lip of the one piece hub comprising a series of spaced, axially extending holes formed in the axially extending lip, and a series of spaced torque bolts secured by one end in the extension of the piston and with the other end extending freely through the axially extending holes of the lip of the one piece hub; means for introducing fluid pressure into the cavity of the one piece hub behind the annular piston for reciprocating the annular piston in the cavity; means for biasing the piston into the cavity of the one piece hub, with the biasing means located at a radial distance less than the radial distance of the torque bolts and the radial midline of the annular piston; means for securing a shaft within the cylindrical portion of the one piece hub, with the fluid pressure introducing means including a rotary union mounted within the cylindrical portion of the one piece hub; a second member in a rotatable relation to the one piece hub and the shaft; and a friction facing mounted to one of the extension or the second member and a friction facing surface for engagement with the friction facing formed on the other of the extension and the second member wherein when fluid pressure is not introduced behind the annular piston by the introducing means, the biasing means biases the annular piston into the cavity for separating the friction facing from the friction facing surface allowing the one piece hub and the shaft and the second member to be rotationally independent and when fluid pressure is introduced behind the annular piston by the introducing means, the annular piston is moved in the cavity against the biasing means for engaging the friction facing and the friction facing surface for rotationally interrelating the one piece hub and the shaft and the second member.

5. The apparatus of claim 4 wherein the biasing means comprises, in combination: a series of spring holes formed in the piston; and springs located in the spring holes and between the one piece hub and the piston.

6. The apparatus of claim 4 wherein the shaft includes a tapered end; and wherein the shafting securing means comprises, in combination: an internal tapered hole which terminates in a cylindrical internal hole to define an annular shoulder formed in the cylindrical portion of the one piece hub; keyway means formed in the internal tapered hole of the cylindrical portion of the one piece hub and the tapered end of the shaft, and a bolt threadedly received into the tapered end of the shaft which abuts against the annular shoulder formed by the internal tapered hole and the cylindrical internal hole of the cylindrical portion of the one piece hub.

7. The apparatus of claim 4 wherein the apparatus is a clutch.

8. The apparatus of claim 4 wherein the second member includes an annular recess having a shape complementary to the shape of and for receiving the extension of the piston to provide a compact apparatus construction for use in crowded areas.

9. The apparatus of claim 8 wherein the second member comprises a pulley having an outer annular flange and an inner annular body portion connected in a spaced relation by a radially extending annular web spaced from one edge of the outer annular flange and one edge of the inner annular body portion, with the annular recess being defined by the outer annular flange, the inner annular body portion, and the annular web.

10. The apparatus of claim 9 further comprising means for rotatably mounting the second member on the one piece hub comprising, in combination: bearing means located between the inner annular body portion of the pulley and the cylindrical portion of the one piece hub.

* * * * *